(12) United States Patent
Linda et al.

(10) Patent No.: US 10,955,385 B2
(45) Date of Patent: Mar. 23, 2021

(54) SOUND MEASUREMENT SYSTEM FOR A MOTOR VEHICLE

(71) Applicant: COMPAGNIE GENERALE DES ETABLISSEMENTS MICHELIN, Clermont-Ferrand (FR)

(72) Inventors: Jean-Louis Linda, Sayat (FR); Thierry Auguet, Clermont-Ferrand (FR); Sylvain Grandjean, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 16/497,208

(22) PCT Filed: Mar. 22, 2018

(86) PCT No.: PCT/FR2018/050697
§ 371 (c)(1),
(2) Date: Sep. 24, 2019

(87) PCT Pub. No.: WO2018/172706
PCT Pub. Date: Sep. 27, 2018

(65) Prior Publication Data
US 2020/0018730 A1 Jan. 16, 2020

(30) Foreign Application Priority Data
Mar. 24, 2017 (FR) ........................................ 1752484

(51) Int. Cl.
*B60R 11/02* (2006.01)
*B60W 40/06* (2012.01)
(Continued)

(52) U.S. Cl.
CPC ........ *G01N 29/223* (2013.01); *B60R 11/0247* (2013.01); *B60W 40/06* (2013.01);
(Continued)

(58) Field of Classification Search
CPC .... G01N 29/221; G01N 29/14; G01N 29/223; G01N 2291/2692; G10K 11/004;
(Continued)

(56) References Cited

U.S. PATENT DOCUMENTS 4,644,794 A * 2/1987 Vaicaitis ................... G01H 3/00
73/583
5,551,298 A * 9/1996 Rayment ............... G01M 7/025
73/579

(Continued)

FOREIGN PATENT DOCUMENTS

DE 4235809 C1 12/1993
DE 102010015032 * 11/2010
(Continued)

OTHER PUBLICATIONS

Journal of Sound and Vibration 310 (2008) 149-168/, Objective evaluation of interior sound quality in passenger cars, Acoustics Vibration Signal Processing Laboratory, Department of Mechanical Engineering, Inha University, Sang-Kwon Lee (Year: 2008).*

(Continued)

*Primary Examiner* — Jacques M Saint Surin
(74) *Attorney, Agent, or Firm* — Venable LLP

(57) ABSTRACT

A sound measurement system intended to be installed on a motor vehicle, the system comprising: a microphone, an element for supporting the microphone, mechanical means for protecting the microphone against various projections (water, dust, etc.) from the environment of the vehicle, and mechanical means for protecting the microphone from airborne noise originating from the routing of the sound wave (Continued)

between the source and the measurement (cavity noise) and from the environment of the measuring system (turbulence around the measuring device), the various mechanical protection means being separate or combined. A motor vehicle may be provided with such a system.

6 Claims, 2 Drawing Sheets

(51) Int. Cl.
G01N 29/14 (2006.01)
G10K 11/00 (2006.01)
G01N 29/22 (2006.01)

(52) U.S. Cl.
CPC ........... *G01N 29/14* (2013.01); *G01N 29/221* (2013.01); *G10K 11/004* (2013.01); *B60T 2210/13* (2013.01); *G01N 2291/2692* (2013.01)

(58) Field of Classification Search
CPC .. B60R 11/0247; B60W 40/06; B60T 8/1725; B60T 2210/13; B60T 2210/10
USPC ........................................................ 73/866.5
See application file for complete search history.

(56) References Cited

U.S. PATENT DOCUMENTS

| 5,586,028 | A | 12/1996 | Sekine et al. |
| 9,764,602 | B2 | 9/2017 | Paturle |
| 2006/0266120 | A1* | 11/2006 | Riegel ................. G01M 17/007 73/587 |
| 2011/0200199 | A1 | 8/2011 | Wakao |
| 2015/0210224 | A1* | 7/2015 | Barna .................... B60R 11/02 381/365 |
| 2015/0321522 | A1 | 11/2015 | Paturle |

FOREIGN PATENT DOCUMENTS

| EP | 2343522 A1 | 7/2011 |
| FR | 2999997 A1 | 6/2014 |

OTHER PUBLICATIONS

Development of a Tire Cavity Sound Measurement System for the Application of Field Operational Tests, *Institute of Vehicle System Technology, Karlsruhe Institute of Technology, Johannes Masino et al. (Year: 2016).*
International Search Report dated Jun. 4, 2018, in corresponding PCT/FR2018/050697 (4 pages).

* cited by examiner

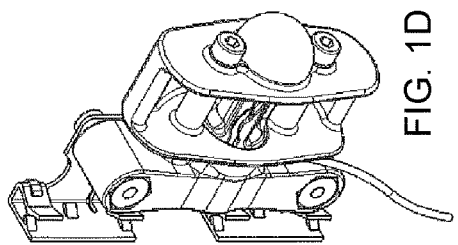
FIG. 1D
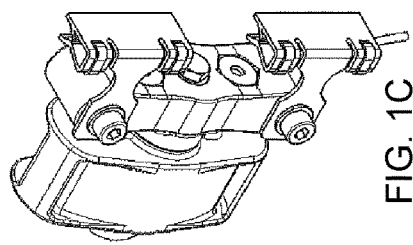
FIG. 1C
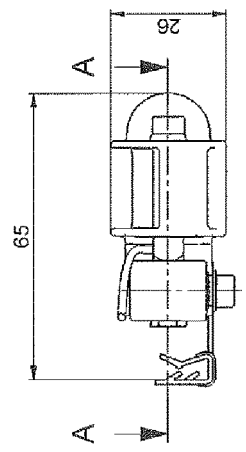
FIG. 1B
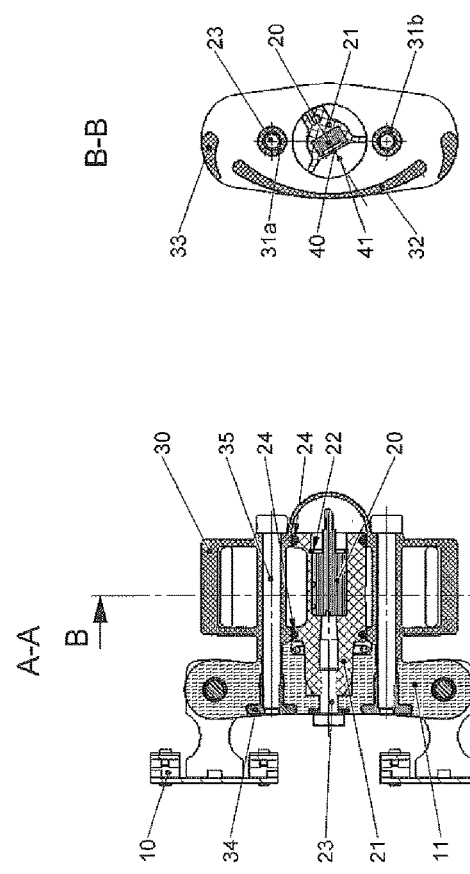
FIG. 1F
FIG. 1G
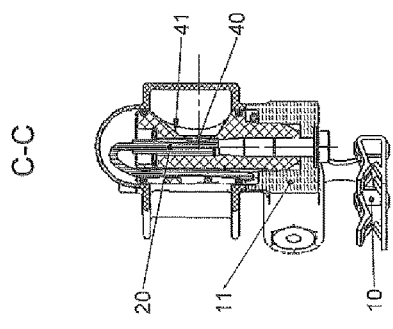
FIG. 1A
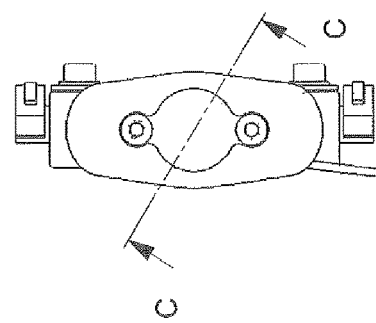
FIG. 1E

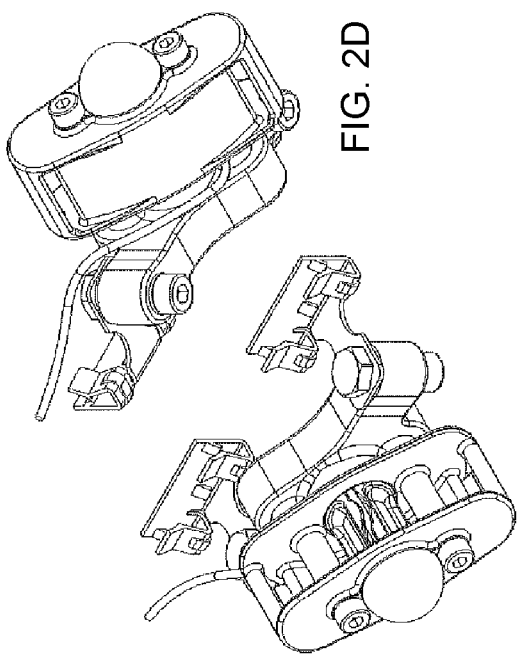
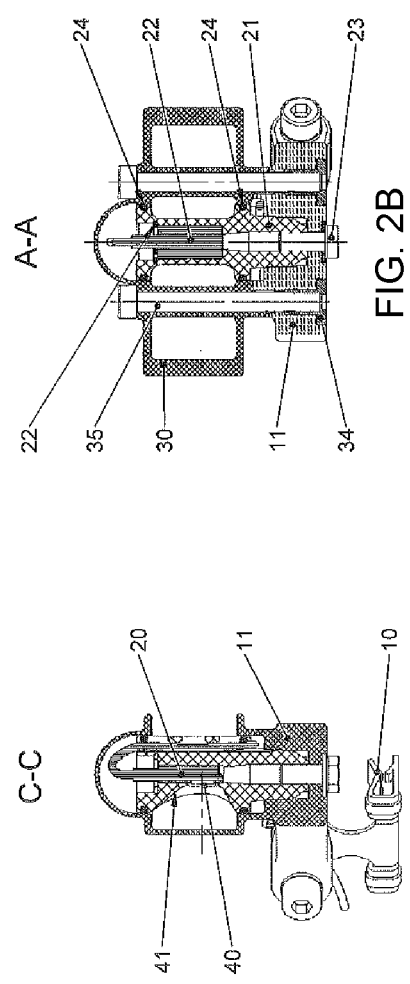
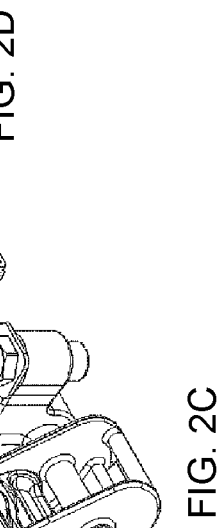
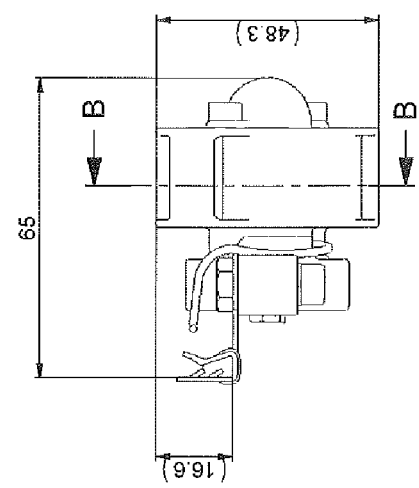
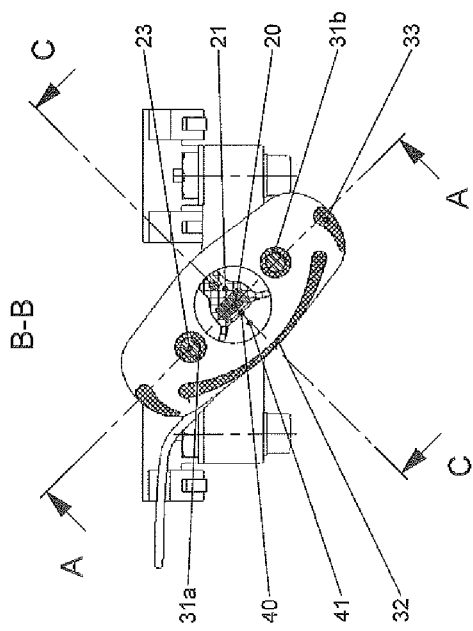

SOUND MEASUREMENT SYSTEM FOR A MOTOR VEHICLE

FIELD OF THE INVENTION

The present invention lies in the field of motor vehicles and their accessories. The invention more particularly concerns a measurement system installed on a vehicle enabling the acquisition of information relevant to determining a state of the road and/or of the tyre.

With the development of driving assistance systems and autonomous vehicles, it appears useful to be able to determine in real time the rolling conditions of the vehicle. Among those rolling conditions there may in particular be cited the state of the road and in particular its meteorological state. By meteorological state is meant for example a dry state, a wet state, a moist state or a drying state. In fact, the meteorological state of the road has a strong influence on the adhesion of the tyres to the ground and therefore on the behaviour of the vehicle when rolling, for example in terms of braking distance, risk of aquaplaning or loss of control. The rolling conditions may also concern the texture of the road, the wear of the tyres, or any other element having an influence on the adhesion of the tyres to the ground.

Known in the prior art are vehicles equipped with video cameras that enable capture of the visual aspect of the road in real time and deduction therefrom of its meteorological state through image analysis. However, it was found that these video cameras did not enable reliable detection under all conditions because the visual aspect of the road is sometimes modified by the type of ground covering or brightness.

There have therefore been developed systems enabling determination of the state of the road based on the analysis of sound recordings produced by microphones disposed in the vicinity of the tyre and the road. However, it has been found difficult to integrate a microphone into the difficult environment near the wheel (compactness, projections (water, dirt), vibrations, turbulence, . . . ) whilst maintaining a signal/noise ratio that can be used to determine the required states described above.

The present invention therefore aims to propose a measurement system enabling some or all of the aforementioned disadvantages to be remedied. The present invention further aims to propose a system that can be attached to a vehicle in a simplified manner.

BRIEF DESCRIPTION OF THE INVENTION

Thus the present invention concerns a sound measurement system intended to be installed on the outside of a motor vehicle, comprising:
  a microphone,
  an element for supporting the microphone with its fixing elements,
  mechanical means for protecting the microphone against projections from the environment of the vehicle,
  mechanical means for protecting the microphone from airborne noise originating from the routing of the sound wave between the source and the measurement as well as from the environment of the measuring system (turbulence around the measuring device),
  the various mechanical protection means being able to be separate or combined.

A measurement system of this kind is intended to analyse the noise from a tyre at the level of the contact with the ground or more generally noise originating from rolling of the tyre on the ground, which also include the noise of projections of water for example. The measurement system is therefore advantageously intended to be installed on the outside of the vehicle. The equipment chosen will therefore be able to resist external conditions in terms of temperature, rain, wind, . . . . Moreover, the dimensions of the measurement system will advantageously be chosen so as to enable relevant positioning on the vehicle, to be described hereinafter.

The noises to be analysed are situated in the frequency range between 100 and 20000 Hz inclusive. In order to prevent the measurements from being falsified by sound pollution generated by the measurement system itself, all of the components, in particular the damping base, the polygonal support and the protective cover, will be sized so that conducted noise and airborne noise generated by these components are pushed as far as possible outside the frequencies of interest.

In one particular embodiment, the element for supporting the microphone, sometimes termed a microphone holder, comprises a polygonal seat circumscribed by a cone. This enables repetitive orientation and positioning of the microphone in various ways relative to the measurement system, depending on how the system is installed. This polygonal seat circumscribed by a cone further makes it possible to immobilize the microphone in a precise position with a single screw, by means of a wedging effect, and with no exterior positioning tool. In fact, a measurement system of this kind can be installed at various locations on the vehicle, for example in the front and/or rear wheel arches. In these two cases the microphone support axis is preferably horizontal, although not necessarily so, that is to say parallel to the axis of the axle, in a position perpendicular to the sound measurement diaphragm. The polygonal seat circumscribed by a cone enables orientation of the microphone in a sloping plane directly behind the tyre to aim at the zone of contact between the tyre and the ground and thus to obtain the best results. The same position and the same orientation of the microphone can therefore be easily found again even after demounting and remounting the microphone several times.

Not only must the measurement system be positioned as close as possible to the noise source but it is also useful for it to be soiled as little as possible by various projections (water, dust, snow, . . . ). To this end, in one advantageous embodiment, in addition to the existing protection (mud flaps) in the wheel arches of most existing vehicles, the mechanical protection means comprise a protective cover comprising:
  a deflector installed between the microphone and the noise source,
  vanes, to be described hereinafter, and
  columns parallel to the microphone support and offering protection, as described hereinafter.

These elements, used alone or in combination, make it possible to block intrusion of water or dirt into the measurement system in a succession of chicanes consisting of the protective cap and the microphone support and thus to protect the sound measurement focus from diverse projections. In fact, the deposition of water droplets or dirt on all or part of the measurement diaphragm of the microphone would modify the function of transferring the sound measurement and lead to falsified measurements.

Moreover, the use of these elements enables protection to be offered to the microphone without it being necessary to enclose it in a cavity closed off from the outside. In fact, it has been found that the installation of a cavity of this kind led to the emergence of cavity acoustic modes that had an influence on the sound signal measured by the microphone and therefore risked falsifying the results of the measurement.

In another embodiment the mechanical protection means comprise lateral lugs installed on the element supporting the microphone. These lugs make it possible to reinforce the protection against projections by serving as an umbrella and diverting the flows of water to either side of the sound sensor.

In another advantageous embodiment the system further comprises mechanical means for protecting the microphone against noise transmitted by conduction in a solid and originating from the vehicle and/or its accessories and/or an element of the measurement system.

In another advantageous embodiment, the system further comprises means for fixing it to the body of a motor vehicle. These means will be described in detail hereinafter with the aid of the figures.

A measurement system according to the invention therefore enables an advantageous response to various requirements intended to enable the acquisition of an acoustic signal that can be exploited correctly:
- to limit the size of the measurement system to integrate it easily into a standard vehicle wheel arch,
- to minimize the volumes potentially generating cavity noises,
- to reduce wind noise around the measurement device generated by the movement of the vehicle to minimize the sound shadow thereof on the microphone,
- to protect the microphone from all projections of water and dirt that may be caused by rolling on wet or dusty ground,
- to isolate the sound measurement system (base, cover, support and microphone) from conducted vibrations of the vehicle, especially at low frequencies,
- to push the mechanical natural frequencies of the protective cover and of the entirety of the system outside the frequencies of interest.

The invention also concerns a motor vehicle comprising one or more measurement systems according to the invention installed on the body of the vehicle in the vicinity of a front or rear wheel, for example in a wheel arch.

BRIEF DESCRIPTION OF THE FIGURES

Other objectives and advantages of the invention will become clearly apparent in the following description of one preferred but nonlimiting embodiment illustrated by the following figures that represent different views and different configurations of a system according to the invention:

FIGS. 1a to 1g show a system according to the invention installed on a front wheel arch of a vehicle, FIGS. 2a to 2f show a system according to the invention installed on a rear wheel arch of a vehicle,

DESCRIPTION OF THE BEST EMBODIMENT OF THE INVENTION

FIGS. 1 and 2 as a whole show two cases of integration of a system according to the invention into a motor vehicle.

In both cases, the system is fixed to welding seams of the vehicle chassis at the level of the wheel arches. Each system is fixed by two fixing elements, each element including metal claws 10 enabling attachment to the metal seam and a support provided with a screw hole enabling attachment of the main casing of the measurement system. The support and the metal claws are fastened together or form a one-piece part. They may be aligned or be at an angle of the order of 90° for example as shown in the figures.

In the case of integration at the level of the front wheel arch, shown in FIGS. 1a to 1g, the claws are for example positioned locally vertical on the seam and then obliquely situated just behind the wheel in the front wheel arch. In order to be able to be housed in the space available between the welding seam and the front wheel arch and its plastic protection, also termed the mud flap, it is useful to limit the thickness of our measurement system to a value between 20 and 300 mm overall.

In the case of integration at the level of the rear wheel arch, shown in FIGS. 2a to 2f, the claws are for example positioned on the horizontal seam situated just behind the wheel, just after the rear wheel arch.

The microphone 20 is installed on a polygonal microphone support 21. The system comprises a protective cap 30 itself composed of two columns 31a and 31b allowing the passage of fixing screws, a deflector 32 with two vanes 33 at its ends. After orienting the microphone in the direction of the sound source care should be taken to place the protection cap asymmetrically with the deflector in front of the diaphragm of the sound sensor, on the back of the microphone facing toward the opening of the protective cap. Positioned in this way, the microphone (still accommodated between the two fixing screw columns) is located in a generous open space (low cavity noise) and protected from external projections. The microphone is nevertheless in direct contact with the exterior via an air passage 40 formed in the microphone support. This air passage comprises a cylindrical section situated just in front of the microphone that has a diameter slightly greater than the diameter of the sensitive element of the microphone, for example a diameter of 5.80 mm, i.e. 116% of the diameter of the microphone, and a length of approximately 0.5 mm. The passage 40 then opens onto an asymmetrical horn 41. This horn has leakage angles between 80° and 120° for example and results in a mean input diameter of 16.2 mm for example, i.e. approximately 320% of the diameter of the microphone, produced in the microphone support itself. This horn also physically assists amplification of the acoustic measurement and produces some directivity.

As indicated above, a system according to the invention aims to limit sound and physical pollution that could degrade the measurements effected by the microphone. The means employed to achieve this objective are seen in the figures.

Thus the effects of wind noise that could be created at the extremities of the deflector 32 are attenuated by vanes 33 that create secondary channels between the interior and the air around the protective cover 30. These secondary channels create an intermediate flow and thereby reduce the speed differential and thus the resulting turbulence and in the final analysis the corresponding noise. The large radii of curvature of the leading edges of the vanes and of the deflector must also favour laminar flow at this location and delay as much as possible the separation of the air streams, that is to say the occurrence of turbulence and therefore of noise. The efficacy of these vanes 33 depends on the angle of attack of the exterior air flow on the protective cap 30.

Otherwise, we have already described some means that enable prevention of projection of water or dirt. However, these means are not able to guarantee a 100% seal. To remedy this, in one example, the surfaces of the chicanes of the deflector 32 and of the microphone support 21 are either oblique or curved in order to enable evacuation by flow by gravity of all droplets of liquid that may have been projected into or condensed inside the chicanes.

In the example where the system is installed at the level of the front wheel arch of the vehicle the deflector 32 is placed parallel to a vertical or oblique seam to ensure good evacuation by flow. In the case of rear integration, the bell has been placed obliquely, for example at 45°, relative to a horizontal seam to guarantee this flow.

All of the components of the measurement system are made from hydrophobic plastic materials suitable for outdoor applications, usable at between −30° C. and +50° C. and resistant to shock. A material will preferably be chosen that is also resistant to hydrocarbons because the position of the measurement system renders it subject to possible projections. A material will therefore be chosen for example in the group comprising: polyethylene, polymethylmethacrylate, polyethylene terephthalate, epoxy resins, polycarbonate and polytetrafluoroethylene.

Moreover, it is known that the chassis of the vehicle is subjected to numerous vibrations originating in particular from the road and the engine (internal combustion engine or electric motor). To damp the transmission of these conducted vibrations to our measurement system, especially at low frequencies, it is useful to employ elastic materials for the damping bases 11 between the chassis, the microphone support 21 and the protective cap 30. Moreover, annular elastomer seals with a Shore A hardness of 60 to 70 for example further separate the cap from the microphone support. It is specified here that the Shore A hardness of the compounds after curing is assessed in accordance with the ASTM D 2240-86 standard. The terms hardness and stiffness will be used interchangeably in the remainder of the description.

Finally, in one embodiment the damping base 11 has been produced in acrylate resin (similar to elastomers) with differential stiffnesses between its central part and its fixing attachments at the ends. The damping base 11 has been produced with a central core (seat of the microphone support and housings for the fixing nuts of the protective cap) that is relatively stiff with a Shore A hardness of 95 for example and more flexible fixing attachments with a Shore A hardness of approximately 50. If there were to be chosen for this component a fabrication process that requires use of homogeneous materials, it would be necessary to modify its structure by a rigid central part to which two flexible end pieces would come to be attached. These damping attachments are preferably designed using hydrophobic elastomers suited to outdoor and vehicle applications and usable between −30° C. and +50° C. Butadiene-acrylonitrile or chloroprene rubber will therefore be used for example.

The invention claimed is:

1. A sound measurement system intended to be installed on a motor vehicle, the system comprising:
   a microphone;
   an element for supporting the microphone;
   mechanical means for protecting the microphone against projections from an environment of the vehicle and for protecting the microphone from airborne noise originating from routing of a sound wave between a source and the measurement system and from the environment of the measurement system; and
   means for fixing the sound measurement system to a metal seam of a chassis of the motor vehicle comprising at least one fixing element comprising at least one metal claw,
   wherein the mechanical means comprise a protective cover comprising a deflector with two vanes at its ends installed between the microphone and the noise source and columns parallel to the microphone installed on respective opposite sides thereof, and
   wherein the sound measurement system further comprises mechanical means for protecting the microphone against noise transmitted by conduction in a solid and originating from the motor vehicle, from an accessory of the motor vehicle, from a component of the sound measurement system, or from a combination of these, said mechanical means comprising a dampening base, wherein a stiffness of a central part of the dampening base is different from a stiffness of a fixing attachment at an end of the dampening base.

2. The sound measurement system according to claim 1, wherein the element for supporting the microphone comprises a polygonal seat circumscribed by a cone.

3. The sound measurement system according to claim 1, wherein the mechanical means comprise lateral lugs installed on the element.

4. A motor vehicle comprising a sound measurement system according to claim 1 installed on a metal seam of the chassis of the motor vehicle in a vicinity of a front wheel of the motor vehicle.

5. A motor vehicle comprising a sound measurement system according to claim 1 installed on a metal seam of the chassis of the motor vehicle in a vicinity of a rear wheel of the motor vehicle.

6. A motor vehicle comprising at least two sound measurement systems according to claim 1.

* * * * *